United States Patent Office 3,385,202
Patented May 28, 1968

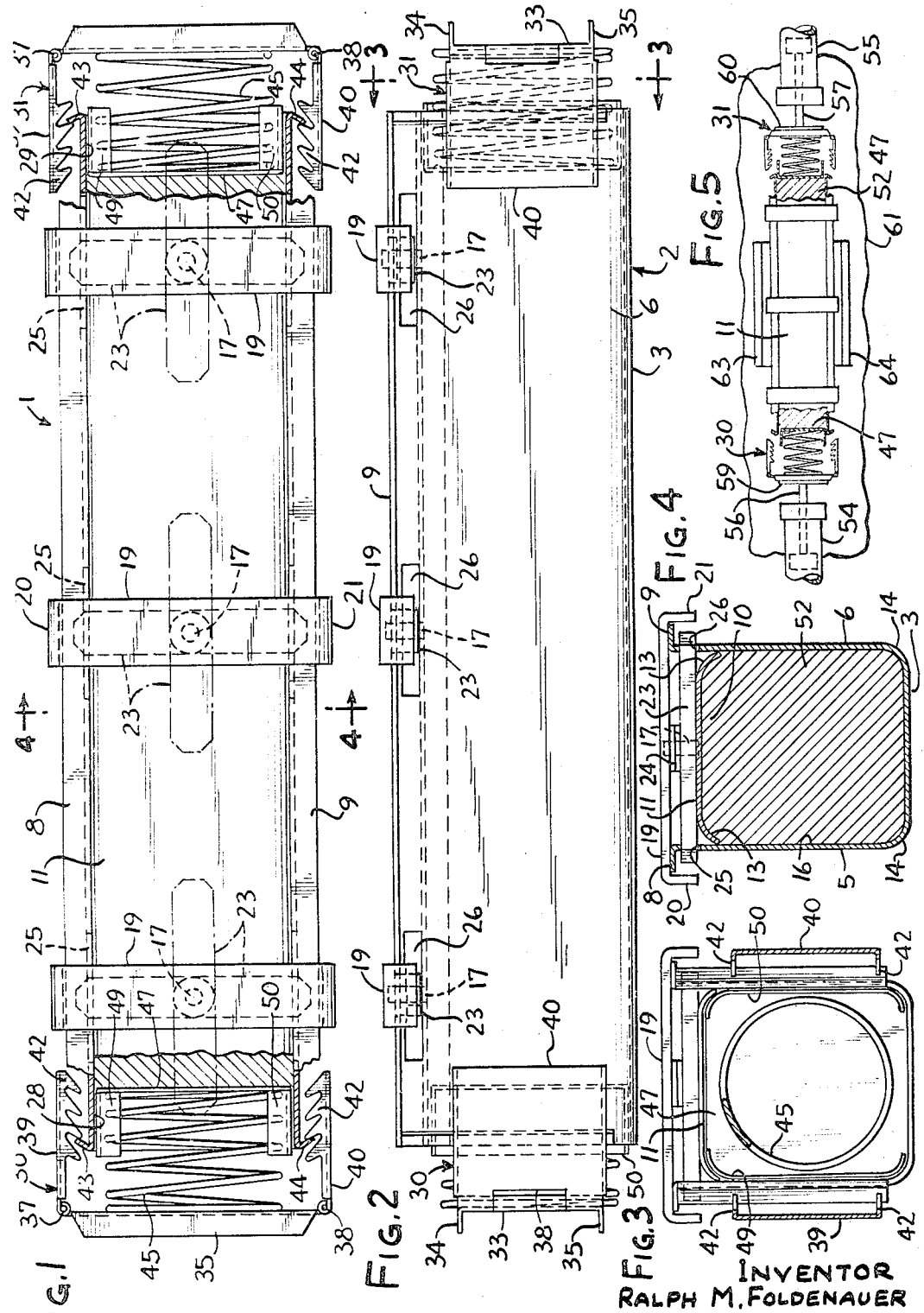

3,385,202
LOAF MOLDING APPARATUS
Ralph M. Foldenauer, Chicago, Ill., assignor to Bloomer-Fiske, Inc., a corporation of Illinois
Filed Sept. 16, 1966, Ser. No. 580,006
8 Claims. (Cl. 99—351)

ABSTRACT OF THE DISCLOSURE

Meat loaf molding apparatus has a mold body open at its opposite ends and along one side thereof. A closure for the side opening is removably retained in place by locator bars that rest on lateral flanges on the mold body sides and by locking bars that project through the body sides. Spring-biased end closures for the mold body have ratchet teeth that engage flanges on the body. Opposed pistons press the end covers into place.

---

This invention relates to apparatus for producing loaves of molded food products, and more particularly to apparatus in which a meat product is under compression in the mold during cooking and chilling of the product.

A conventional meat-loaf mold comprises a tube of uniform cross section having a removable plate forming a closure for one end and a spring-biased lid for closing the other end and for applying compression to the loaf in the mold. Compression is applied to the product during cooking and chilling in an effort to produce a loaf of uniform density and cross section so that when the loaf is removed from the mold it may be sliced by high-speed automatic machinery into equally thick slices of substantially uniform weight.

A mold of the foregoing type must be end loaded. One way of accomplishing this is to utilize a loaf mold stuffer in which the meat is extruded into the mold through a tube to which a stuffer horn is attached at the discharge end. Initially, the tube is axially disposed within the mold for the full length thereof with the discharge end of the tube at one end of the mold. As the extruded meat fills the mold in the space between the end of the tube and the adjacent end of the mold, the mold is advanced axially until the end of the tube and stuffer horn reaches the other end of the mold, at which time the mold is filled. Then the spring-biased lid is mounted on the mold end and force is applied to the lid to apply a desired amount of compression to the product. This force is usually applied by a mold cover press.

Another way of filling the mold is to pre-mold the meat in a suitable press to approximately the shape of the mold and then force the pre-molded loaf axially into the end of the mold, after which the spring-biased lid is pressed in place. Pre-molding the meat is used where the loaf is formed of chucks or other pieces of meat of substantial size.

In each of the above procedures expensive pieces of machinery must be utilized. Moreover, it has been found that end loading results in a certain amount of air entrapment which causes a cooked product of non-uniform density. To avoid this, it is common to repress the molded loaf after it has been cooked and while it is still in the mold. Also, end loading seems to disturb the uniformity of grain structure of the meat which results in non-uniform slices.

It is an object of the present invention to provide a loaf mold having spring-biased end lids that hold the product under continuous compression during cooking and chilling and wherein the mold has a longitudinal opening through which the mold may be filled, the longitudinal opening being covered by a removable closure which, when in closed position, cooperates with the remainder of the mold to maintain a uniform cross section and density of the loaf.

It is a further object of the present invention to provide an apparatus in which the mold may be filled through the longitudinal opening, with both end lids partially in place after which the closure for the longitudinal opening is locked in place, and then pressure may be applied to both end lids to lock them in place and put the loaf under sufficient compression so that during cooking and chilling the loaf is maintained at substantially uniform density and cross section.

It is an additional object of the present invention to provide apparatus of the type stated which reduces the amount of air entrapment in the mold and in which the need for repressing the loaf after cooking is eliminated.

It is a further object of the present invention to provide apparatus of the type stated which eliminates the need for machinery for pre-forming the loaf prior to inserting it in the mold and for extruding the meat into the mold.

The attainment of the above and the object of the present invention will be apparent from the following description taken in conjunction with the accompanying drawing forming a part thereof.

In the drawing:
FIG. 1 is a top plan view, partially broken away, of a mold constructed in accordance with and embodying the present invention;
FIG. 2 is a side elevational view of the mold;
FIG. 3 is a sectional view taken along line 3—3 of FIG. 2;
FIG. 4 is a sectional view taken along line 4—4 of FIG. 1; and
FIG. 5 is a top plan view of apparatus for pressing the spring-loaded end closures onto the mold body after the mold has been filled.

Referring now in more detail and by reference characters to the drawing, which illustrates a preferred embodiment of the present invention, 1 designates a mold comprising an elongated hollow body 2 having a bottom wall 3 and spaced, parallel longitudinally extending side walls 5, 6. At their upper ends, the side walls 5, 6 have laterally extending terminal flanges 8, 9.

The upper end portion of the mold body 2 is open throughout the full length thereof to provide a longitudinal opening 10 through which the mold body 2 may be filled. A removable closure plate 11 of substantially the same length as the body 2 is adapted to close the opening 10. The closure plate 11 does not form a hermetic seal due to small clearance spaces between the lateral edges of the plate 11 and the side walls 5, 6. As best seen in FIG. 4, the central part of the closure plate 11 is parallel to the bottom wall 3 when the closure plate 11 is in closed position. At its sides, the closure plate 11 has inwardly turned radii 13, 13 which are similar to the radii 14, 14 that join the bottom wall 3 with the side walls 5, 6. These radii avoid sharp corners along the length of the mold and enable the product within the mold readily to assume the cross sectional shape of the mold cavity 16 when the product therein is placed under compression, as will hereinafter be explained. In the present form of the invention, the mold cavity 16 is approximately square in cross section although a mold cavity of rectangular or other cross section may be used.

The closure plate 11 is suitably secured in proper position recessed within the mold body 2 by a locating and locking arrangement. For this purpose pins 17 are welded to the top side of the closure plate 11 at longitudinally spaced intervals and midway between the longitudinal sides thereof. Each pin 17 is also welded to the middle of a U shaped locator bar 19 so that the locator bars 19 are spaced from the closure plate 11. The locator bars 19 rest upon the flanges 5, 6 and thereby position the closure plate 11 at the proper predetermined distance from the bottom wall 6 to form the desired uniform cross-sectional area for the mold cavity 16. Each locator bar 19 also has depending legs 20, 21 which lie on either side of the flanges 8, 9 to facilitate lateral positioning of the closure plate 11 when assembling the closure plate 11 with the mold body 2.

Rotatably mounted centrally on each pin 17 and adjacent to the closure plate 11 is a locking bar 23 having a length that is greater than the distance between the side walls 5, 6. Washers 24 may also be mounted on each pin 17 intermediate the locking bar 23 and locator bar 19. The opposite ends of each locking bar 23 are adapted to engage in slots 25, 26 in the side walls 5, 6 that are just below the flanges 8, 9 to lock the closure plate 11 in position. Each locking bar 23 may be rotated out of engagement with the slots 25, 26, say from the dotted line positions of FIG. 1 to the broken line positions therein to enable the cover plate 11, together with the locking bars 23 and locator bars 19, to be completely separated as a unit from the mold body 2.

The mold body 2 also has open opposite ends 28, 29 that are adapted to be closed by identical end closures 30, 31. Each end closure comprises a rectangular base or spring backing 33 having opposed outwardly extending flanges 34, 35. Secured to the transverse ends of the backing 33 by hinges 37, 38 are arms 39, 40, the lateral margins of which are inwardly turned and shaped to provide uniform groups of ratchet teeth 42, two groups being on each arm 39, 40. The corresponding ratchet teeth in each group are adapted to engage outwardly and reversely turned flanges 43, 44 at each of the ends of the side walls 5, 6 to hold the end closures onto the mold body 2.

Welded or otherwise rigidly secured at one end to each backing 33 is a coil compression spring 45, the longitudinal axis of which is preferably coaxial with the mold cavity 16 that is formed when the closure plate 11 and end closures are mounted on the body 2. The other end of the spring 45 is welded to a pressure plate 47 that is slidably disposed in the associated end 28, 29 and has a perimetral shape substantially same as that of the cross section of the mold cavity 16. The pressure plate 47 has opposed marginal flanges 49, 50 which telescope with the side walls 5, 6 and the radii 13, 14 and thus serve as aid in keeping the pressure plate 47 at right angles to the longitudinal axis of the mold cavity 16 as the spring 45 changes its length. The springs 45, 45 maintain the respective pressure plates 47, 47 in pressure engagement with the ends of the loaf 52 so that the ends of the loaf 52 are always at right angles to the longitudinal axis of the loaf. Likewise, the forces from the compressed springs 45 maintain the ratchet teeth 42 in engagement with the flanges 43, 44.

Prior to filling the mold 1, the mold body 2 is placed on a suitable support 61 between two angles bars 63, 64 thereon. The cover 11 is removed so that the longitudinal opening 10 is upwardly presented. The end closures 30, 31 are positioned as shown in FIG. 5, namely so that the pressure plates 47, 47 are just inside the open ends of the body 2 but none of the ratchet teeth 42 are engaged with the flanges 43, 44. In these positions of the end closures the springs 45, 45 are not compressed.

Adjacent to each end of the mold body 2 are pneumatic cylinders 54, 55 having piston rods 56, 57 that terminate in plates 59, 60 which are adapted to bear against the backings 33 between the flanges 34, 35, and thereby temporarily hold the pressure plates 47, 47 inside of the open ends of the mold body 2. These cylinders 54, 55 are rigidly mounted on the support 61 so that the piston rods 56, 57 will be substantially coaxial with the mold cavity 16. In this regard it should be noted that the support 61 may be any suitable work platform, such as a portable frame, or a table which may have caster-supported legs so that the table may be moved about, as desired. These pieces may be placed in the mold so that the grain of the meat is oriented longitudinally of the mold.

The mold is filled through the open top with the product 52. By way of example but not of limitation, the product may be pieces of ham or other meat. Also suitable control valves may be mounted on the support 61 to supply air selectively to either end of each cylinder 54, 55 and thereby move either piston rod 56, 57 in both directions, or to move the piston rods in unison in opposite directions. When the mold has been filled, the closure 11 is mounted in place and the locking bars 23 turned to engage the slots 25, 26. Thereafter, pressurized air is introduced into the cylinders 54, 55 to move the piston rods 56, 57 toward each other. The piston rods apply pressure through their plates 59, 60 which is transmitted through the springs 45, 45 to the pressure plates 47, 47. This moves the pressure plates 47, 47 toward each other so that the meat product 52 may be placed under a desired amount of compression and caused to fill the mold cavity 16 completely. The grain of the meat is relatively undisturbed by the compression. The resistance of the product 52 causes compression of the springs 45, 45 resulting in movement of the arms 39, 40 toward the flanges 43, 44. The arms 39, 40 may be swung about their respective hinges to bring the ratchet teeth 42 into engagement with the flanges 43, 44, as shown in FIG. 1. The piston rods 56, 57 may then be retracted from the end closures 30, 31, leaving the springs 45, 45 held compressed by the engagement of the ratchet teeth 42 with the flanges 43, 44.

The closed mold may then be removed from the support 61 and placed in a suitable steam chamber or other heated atmosphere to cook the loaf 52. During cooking, the loaf will undergo expansion and contraction and will ultimately end up smaller in length than the originally pressed length it had when the cooking began. However, the spring-biased pressure plates 47, 47 maintain the loaf constantly under sufficient compression to assure that the loaf always fully fills the mold cavity so that the completed loaf has a uniform cross section. Since the grain of the loaf has been relatively undisturbed, when the cooked loaf is run through a slicing machine to slice it at right angles to its longitudinal axis, the slicing will be across the grain.

In compliance with the requirements of the patent statutes, I have herein shown and described a preferred embodiment of the invention. It is, however, to be understood that the invention is not limited to the precise construction herein shown, the same being merely illustrative of the principles of the invention.

What is considered new and sought to be secured by Letters Patent is:

1. A loaf mold comprising an elongated hollow body for receiving a product to be molded as a loaf and wherein the product is subject to change in longitudinal dimension during the mold-processing operation, said body having a longitudinal opening through which the mold may be filled and said body having longitudinal sides with terminal portions adjacent to said longitudinal opening, a closure member for said longitudinal opening, means for locating said closure member at a predetermined position recessed in said body when the closure member is in closed position, said locating means engaging said terminal portions, means joining said locating means with said closure member, means for releasably locking the closure member to said body in closed position, said locking means comprising locking bars between the closure member and said locating means and rotatable into engagement with slots on said longitudinal sides, said body also having opposite ends and a removable closure for each end, at least one of said end closures comprising a pressure plate movably disposed in an open end for engagement with the adjacent end of the product in the mold, and spring means for imposing axial pressure on the pressure plate to maintain it in continuous pressure engagement with the product after the mold has been filled and as the product changes longitudinal dimension during the mold-processing operation.

2. A loaf mold according to claim 1 in which the mold with the longitudinal closure and the end closures in place has a molding cavity having a uniform transverse cross section.

3. A loaf mold according to claim 1 in which of said end closures comprises a pressure plate, spring means, and means for releasably attaching each spring means to said body, said last-named means for each closure including a backing for each spring means and cooperating ratchet members on each backing and the body, the pressure of said spring means maintaining the ratchet members in engaged positions.

4. A loaf mold according to claim 1 in which each end closure comprises a pressure plate slidably telescoped in one end and spring means for imposing axial pressure on each pressure plate, cooperating means on each end closure and the body for attaching the closures to the body, in combination with means for applying axial pressure to each of said end closures to cause each spring means to apply to the associated pressure plate a desired amount of compression to the product in the mold.

5. A loaf mold comprising an elongated hollow body for receiving a product to be molded as a loaf and wherein the product is subject to change in longitudinal dimension during the mold-processing operation, said body having a bottom wall and spaced longitudinal side walls, said side walls having terminal portions that define opposed margins of a longitudinal opening through which the mold may be filled, said terminal portions including flanges that project laterally of said walls, a closure member for said longitudinal opening, means for removably retaining the closure member in a predetermined location of closed position within said body, said means spanning the space between said walls in overlying relation to said closure member and having portions thereof disposed across said flanges and turned toward said bottom wall to straddle said flanges, said body also having opposite ends and a removable closure for each end, at least one of said end closures comprising a pressure plate movably disposed in an open end for engagement with the adjacent end of the product in the mold, and spring means for imposing axial pressure on the pressure plate to maintain it in continuous pressure engagement with the product after the mold has been filled and as the product changes longitudinal dimension during the mold-processing operation.

6. A loaf mold according to claim 5 in which said means for removably retaining said closure member also includes elements that lie laterally of said side walls and are intermediate said flanges and said bottom wall.

7. A loaf mold according to claim 5 in which each end closure comprises a pressure plate, spring means, and ratchet teeth cooperating with flanges on the ends of said body for retaining the end closure on the body.

8. A loaf mold according to claim 7 in combination with axially reciprocable means for applying pressure to both of said end closures for compressing the product in the mold.

References Cited

UNITED STATES PATENTS

| | | | |
|---|---|---|---|
| 470,887 | 3/1892 | Finsterer | 292—256 |
| 1,577,851 | 3/1926 | Peschke. | |
| 1,624,808 | 4/1927 | Scholten | 99—351 |
| 1,792,411 | 2/1931 | Butz | 99—351 |
| 1,863,609 | 6/1932 | Van der Kloot | 99—351 |
| 1,962,877 | 6/1934 | Roth et al. | 99—351 |
| 1,981,889 | 11/1934 | Wolff | 99—351 |
| 2,244,540 | 6/1941 | Lenzke. | |
| 2,696,442 | 12/1954 | Allbright. | |
| 3,039,382 | 6/1962 | Simon et al. | 100—219 |

FOREIGN PATENTS

| | | |
|---|---|---|
| 13,697 | 7/1933 | Australia. |
| 457,932 | 12/1936 | Great Britain. |

BILLY J. WILHITE, *Primary Examiner.*